(12) United States Patent
Lawson

(10) Patent No.: US 7,137,763 B2
(45) Date of Patent: Nov. 21, 2006

(54) PNEUMATICALLY DRIVEN DEBURRING TOOL HAVING AN ARTICULATED AIR JOINT

(75) Inventor: Douglas K. Lawson, Chapel Hill, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 168 days.

(21) Appl. No.: 10/916,864

(22) Filed: Aug. 12, 2004

(65) Prior Publication Data

US 2005/0180829 A1     Aug. 18, 2005

Related U.S. Application Data

(63) Continuation-in-part of application No. 10/628,063, filed on Jul. 25, 2003, now Pat. No. 6,974,286.

(51) Int. Cl.
*B23C 3/12* (2006.01)
*B23C 1/20* (2006.01)

(52) U.S. Cl. ............... 409/140; 409/138; 409/201; 409/231; 408/127; 408/236

(58) Field of Classification Search ........ 409/138–140, 409/180, 143, 184, 201, 206, 231–232; 901/47; 408/127, 130, 236–237, 239 R; 451/358
See application file for complete search history.

(56) References Cited

U.S. PATENT DOCUMENTS

| | | | | |
|---|---|---|---|---|
| 1,782,633 | A * | 11/1930 | Schiltz | 279/16 |
| 2,108,699 | A * | 2/1938 | Walther | 408/127 |
| 4,332,066 | A * | 6/1982 | Hailey et al. | 29/26 R |
| 4,338,052 | A * | 7/1982 | Lockett | 409/206 |
| 4,637,775 | A * | 1/1987 | Kato | 414/744.2 |
| 4,784,540 | A | 11/1988 | Underhaug | |
| 4,798,024 | A | 1/1989 | Grimm | |
| 4,800,802 | A * | 1/1989 | Rebman | 92/61 |
| 4,836,722 | A * | 6/1989 | Kurita et al. | 409/132 |
| 4,860,500 | A * | 8/1989 | Thompson | 451/11 |
| 4,993,896 | A * | 2/1991 | Dombrowski et al. | 409/138 |
| 5,312,212 | A * | 5/1994 | Naumec | 409/138 |
| 5,765,975 | A * | 6/1998 | Hoffmann et al. | 409/138 |

(Continued)

FOREIGN PATENT DOCUMENTS

DE       3710688       10/1988

(Continued)

OTHER PUBLICATIONS

CNC-Flexicut 240, product description flier from Amtru Business AG, Jul. 2004, 4 pages.*

Primary Examiner—Erica Cadugan
(74) Attorney, Agent, or Firm—Coats & Bennett, P.L.L.C.

(57) ABSTRACT

A pneumatically driven deburring device having a housing and a pneumatic motor mounted therein which is adapted to receive and drive a deburring tool. A pivot bearing is mounted within the housing adjacent the pneumatic motor. A motor support is held within the pivot bearing and extends therefrom where the motor support connects to the pneumatic motor. An air inlet is disposed adjacent the pivot bearing and is communicatively connected thereto. Air for driving the pneumatic motor is directed through the air inlet, and through a hollow portion of the motor support to where air is directed into the pneumatic motor. Because the motor support is supported or contained within the pivot bearing, it follows that the motor support articulates with the pivot bearing and hence the pneumatic motor moves with the articulating motor support.

31 Claims, 12 Drawing Sheets

U.S. PATENT DOCUMENTS

| | | | |
|---|---|---|---|
| 6,086,294 A | * | 7/2000 | Danchine et al. ........... 409/132 |
| 6,974,286 B1 | * | 12/2005 | Lawson ...................... 409/140 |
| 2005/0180829 A1 | * | 8/2005 | Lawson ...................... 409/140 |
| 2006/0067800 A1 | * | 3/2006 | Lawson ...................... 409/140 |

FOREIGN PATENT DOCUMENTS

| | | | |
|---|---|---|---|
| DE | 4242874 | | 11/1993 |
| EP | 249722 A1 | * | 12/1987 |
| EP | 0307550 | | 3/1989 |
| EP | 421917 A1 | * | 4/1991 |
| EP | 1052044 A1 | * | 11/2000 |
| GB | 2404163 | | 1/2005 |
| JP | 59-214509 A | * | 12/1984 |
| JP | 60131106 | | 7/1985 |
| JP | 64-2811 A | * | 1/1989 |
| WO | WO 02/064323 | | 8/2002 |

* cited by examiner

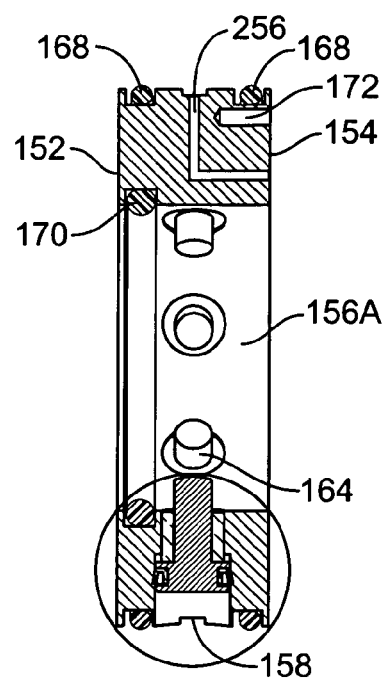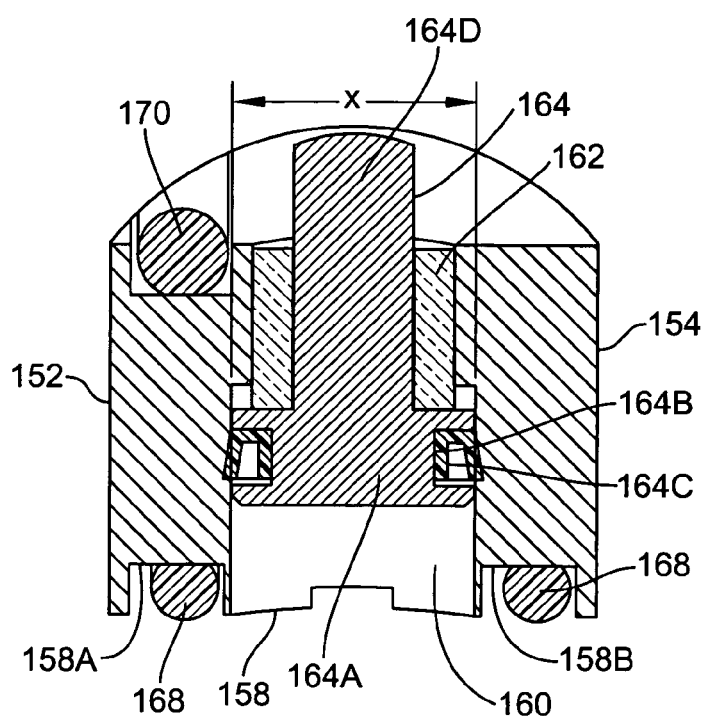
FIG. 6  FIG. 7
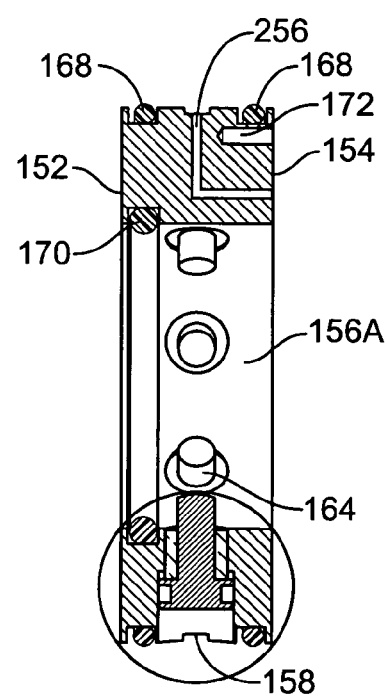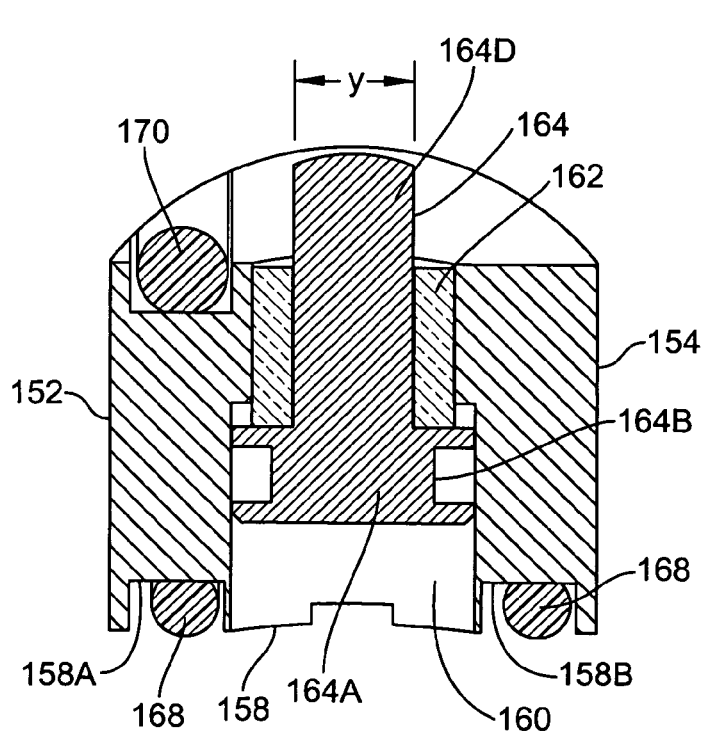
FIG. 8  FIG. 9

PNEUMATICALLY DRIVEN DEBURRING TOOL HAVING AN ARTICULATED AIR JOINT

CROSS REFERENCE TO RELATED APPLICATION

This is a continuation-in-part of U.S. patent application Ser. No. 10/628,063, now U.S. Pat. No. 6,974,286, filed Jul. 25, 2003 and entitled "Deburring Tool".

FIELD OF THE INVENTION

The present invention relates to deburring tools and devices, and more particularly to a pneumatic driven deburring device.

BACKGROUND OF THE INVENTION

Deburring tools have long been utilized in robotic systems to perform repetitive tasks. These deburring tools are capable of performing a wide variety of deburring functions such as deburring the edges of machined and cast parts.

For the most part, conventional deburring tools utilized in commercial and industrial applications include a pneumatic motor and hence are pneumatically driven. In robotic systems, it is common to provide a source of compressed air that is directed to a tool changer. When a deburring tool is connected to the tool changer, the compressed air is directed from the tool changer through an air hose to the deburring tool. In many cases, because of the configuration of the deburring tool and the type of pneumatic motor utilized, air is supplied through a sidewall of the tool.

There are situations where it would be desirable to provide an axial feed of compressed air to a deburring tool. For example, deburring tools can be mounted on conventional machine systems such as a CNC machine. These types of systems and machines generally include a source of compressed air. In many cases, the compressed air supplied by machine systems such as CNC machines is directed downwardly through a drive shaft that is actually utilized to drive a connected tool.

In the case of a deburring tool, providing an axial feed of compressed air is somewhat challenging. This is because the pneumatic motor housed within the deburring tool is provided with a compliance feature that allows the motor to move with respect to the housing during deburring operations. For example, in cases where the compliance function is carried on a front portion of the deburring tool it will follow that the base or back of the pneumatic motor will be required to move with respect to the back of the housing of the deburring tool. Thus in directing an axial feed of compressed air into and through the back of the deburring tool, it is required that the compressed air be channeled in such a fashion that the air is directed to the pneumatic motor and at the same time that the structure utilized to channel the compressed air be maintained sealed.

SUMMARY OF THE INVENTION

The present invention entails a pneumatic driven deburring device having a housing and a pneumatic motor mounted in the housing. A pivot bearing is mounted adjacent the motor. Secured or retained within the pivot bearing is a motor support that extends from the pivot bearing and is movable with the pivot bearing. A remote end portion of the motor support connects to the motor. An air inlet is disposed adjacent the pivot bearing. The air inlet, pivot bearing and motor support are arranged such that air for driving the deburring device is directed through the air inlet and therefrom through at least a portion of the pivot bearing and into and through the motor support.

In another embodiment, the present invention comprises a pneumatic driven deburring device having a housing and a pneumatic motor mounted in the housing, and operative to drive a deburring tool. Also provided are an air inlet and an articulated joint disposed between the air inlet and the motor. Forming a part of the articulated joint is an articulated motor support and an air passageway that extends at least partially through a portion of the articulated joint. The motor support is connected to the motor and at least partially supports the motor such that the motor moves with the motor support as the motor support articulates. Air for driving the motor is directed into and through the air inlet, through the air passageway associated with the articulated joint, and to the motor.

Further, the present invention entails a method of supporting and directing air to a pneumatic motor of a deburring tool. This method entails disposing the pneumatic motor within a housing and supporting a motor support in a pivot bearing. The motor support is secured to the motor such that the motor support can articulate in the pivot bearing and the pneumatic motor can move with the motor support. Air to drive the pneumatic motor is directed though at least a portion of the pivot bearing and through a portion of the motor support extending from the pivot bearing to the pneumatic motor. Air leaving the motor support and entering the motor functions to drive the motor.

Other objects and advantages of the present invention will become apparent and obvious from a study of the following description and the accompanying drawings which are merely illustrative of such invention.

BRIEF DESCRIPTION OF THE DRAWINGS

FIG. 6 is a sectional view of the compliance device illustrating the compliance device set-up for operation in one mode.

FIG. 7 is an enlarged sectional view of a portion of the compliance device shown in FIG. 6.

FIG. 8 is a sectional view of the compliance device set-up for operation in a second mode.

FIG. 9 is an enlarged sectional view of a portion of the compliance device shown in FIG. 8.

DESCRIPTION OF EXEMPLARY EMBODIMENTS

Figure 1:
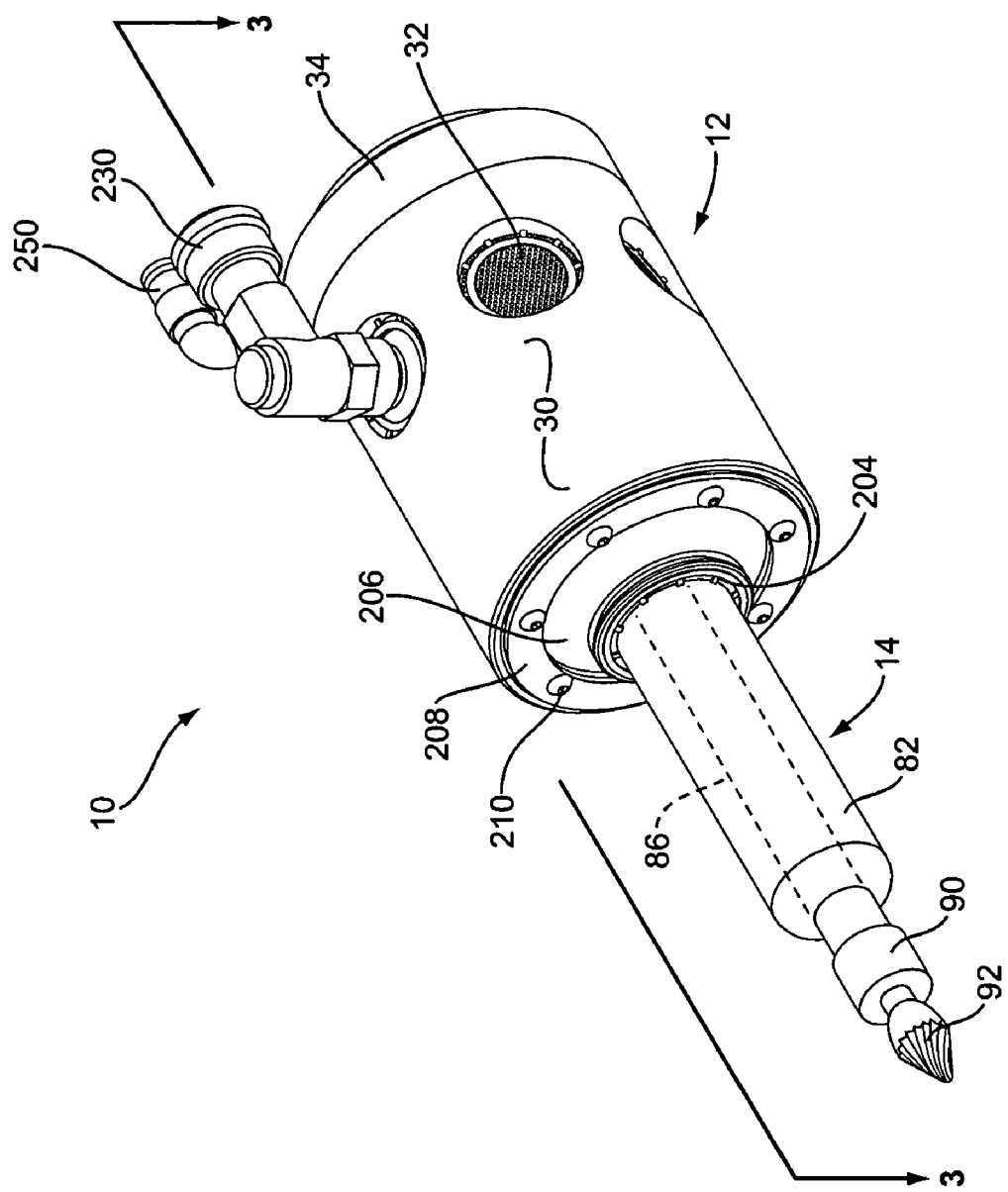
FIG. 1 is a perspective view of the deburring tool.

With further reference to the drawings, the deburring tool of the present invention is shown therein and indicated generally by the numeral 10. Deburring tool 10 includes a housing 12. Mounted within the housing is a pneumatic motor 14. Pneumatic motor 14 is supported within the housing 12 by a bearing assembly 16 and a compliance device 20. More particularly, a pivot bearing 16 is operatively connected to the back of pneumatic motor 14 through a connector indicated generally by the numeral 18. Pneumatic motor 14 is effectively suspended or supported at the rear by the pivot bearing 16. A front or spindle portion of the pneumatic motor 14 projects through the compliance device 20. As will be appreciated from subsequent portions of the disclosure, the pivot bearing 16 enables the pneumatic motor 14 to freely articulate radially in any direction while preventing free rotation about the bearing's longitudinal axis. Compliance device 20, which surrounds the spindle or front portion of the pneumatic motor 14, functions to center the spindle of the pneumatic motor 14, but also yields in response to a disturbing force experienced by the deburring tool 10.

Figure 2:
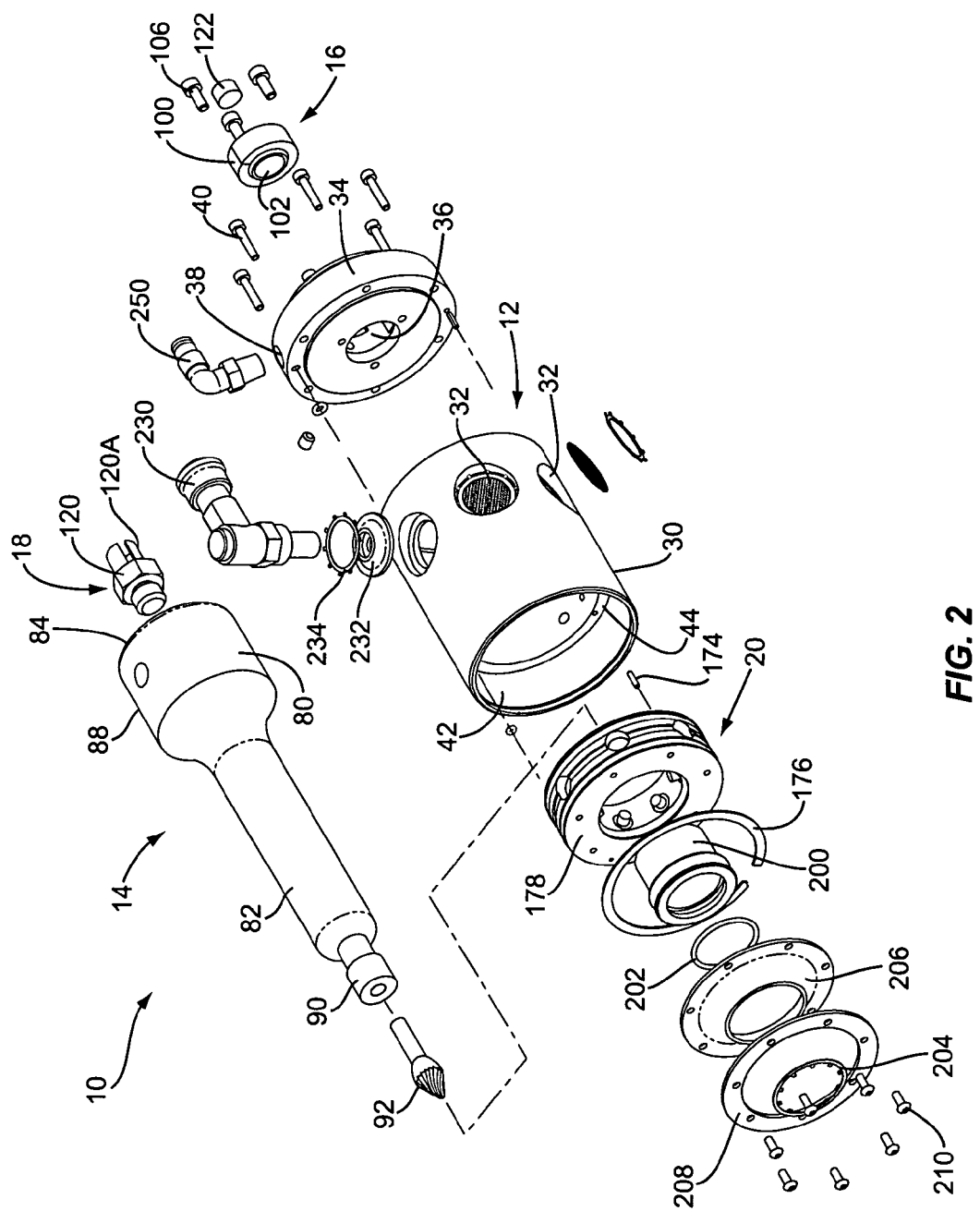
FIG. 2 is an exploded perspective view of the deburring tool.
Figure 3:
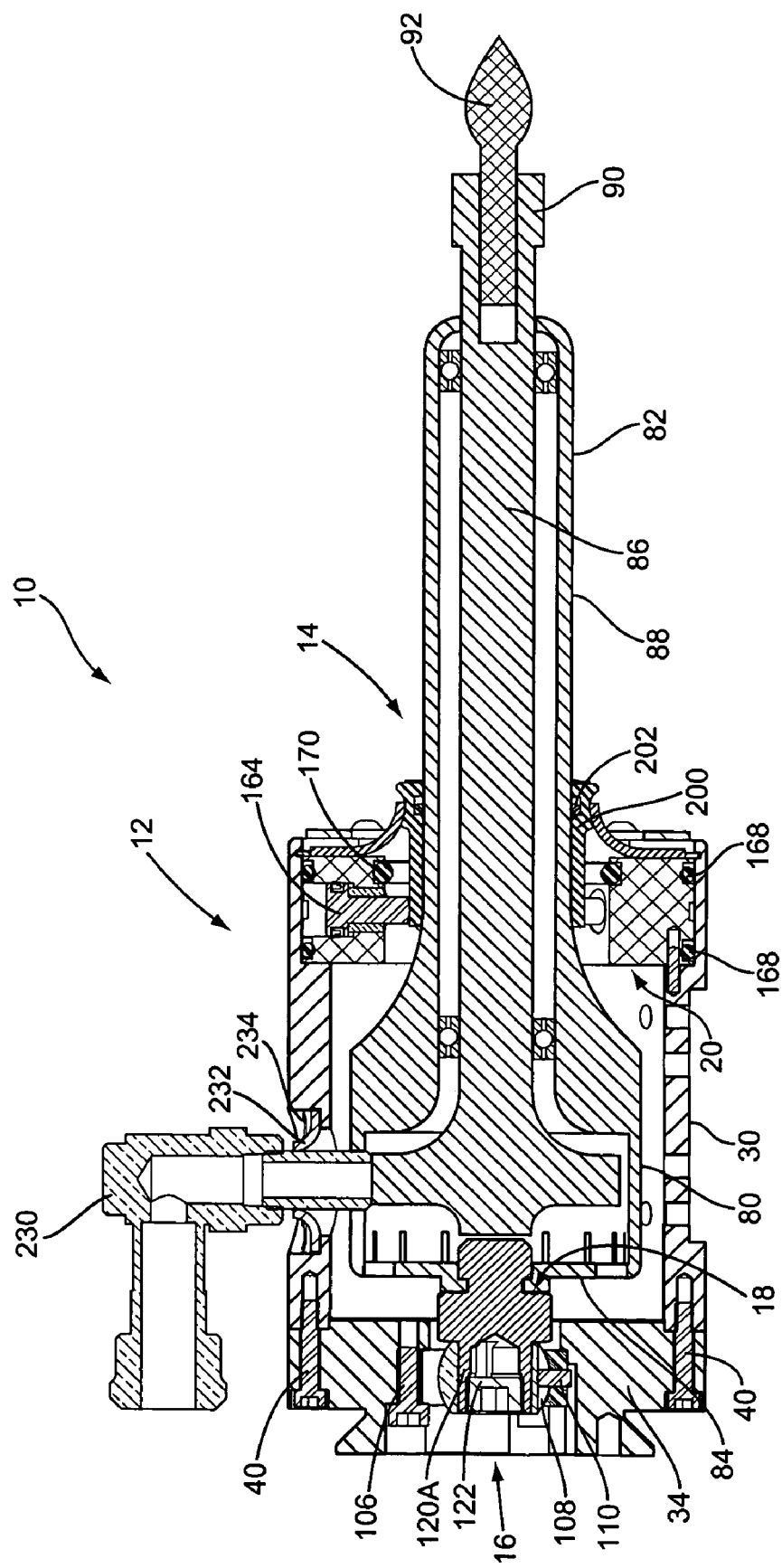
FIG. 3 is a longitudinal sectional view of the deburring tool taken through the line 3—3 of FIG. 1.

Turning first to a discussion of the housing 12, it is seen from FIGS. 1–3 that the housing includes a cylindrical section 30. The cylindrical section includes a series of openings 32. Some of the openings 32 function to exhaust air utilized by the pneumatic motor 14 while another opening provides access for an air inlet through which compressed air passes for the purpose of driving the pneumatic motor 14. As seen in the drawings, opposite ends of the cylindrical section 30 are open. Secured to the rear portion of the cylindrical section 30 is a back plate 34. Back plate 34 includes a central opening 36 formed therein. Formed about the outer circumference of the back plate 34 is an air inlet 38. As will be discussed in further detail subsequently herein, compressed air is directed through the air inlet 38 and to the compliance device 20 which is mounted in the front portion of the housing 12.

Formed about the circumference of the back plate 34 is a series of through bores. A series of screws 40 project into these through bores and into threaded openings formed around the back edge of the cylindrical section 30. Consequently the screws 40 effectively secure the back plate 34 to the central section 30. Opposite the back plate 34 is a front opening 42 which can be seen in FIG. 2. Spaced inwardly from the front opening is a circumferential shoulder 44. Again, as will be understood from subsequent portions of this disclosure, shoulder 44 serves as a stop against which the compliance device 20 rests when the compliance device is appropriately secured within housing 12. As noted above, the pneumatic motor 14 is housed within housing 12. Various types of pneumatic motors can be utilized. In one exemplary embodiment, a pneumatic motor of an air turbine type rated at 340 watts and 40,000 rpm would be appropriate. In the case of the pneumatic motor 14, particularly shown in FIGS. 2 and 3, for purposes of reference, the pneumatic motor 14 includes a rear portion 80 and a front portion including a spindle housing 82. As illustrated in FIGS. 2 and 3, note how the rear portion 80 tapers down and transitions into the spindle housing 82. The rear or back portion 80 is of a cross-sectional area greater than the spindle housing 82. By the same token, the rear portion 80 is more massive than the front portion of the motor 14. Consequently, the center of gravity of the motor 14 tends to reside in or near the rear portion 80. Spindle housing 82 would include a spindle 86 that extends through the front or spindle portion and is operative to drive a collet 90. Secured to collet 90 in a conventional fashion is a cutter or deburring tool 92.

Pneumatic motor 14 includes a housing 88 and forming a portion of the housing is a back or back wall 84. Back 84 includes a threaded opening formed therein. As will be discussed later, the threaded opening receives and supports a connector that projects therefrom and which connects to the bearing assembly 16 which effectively supports the rear portion of the pneumatic motor 14.

Figure 4:
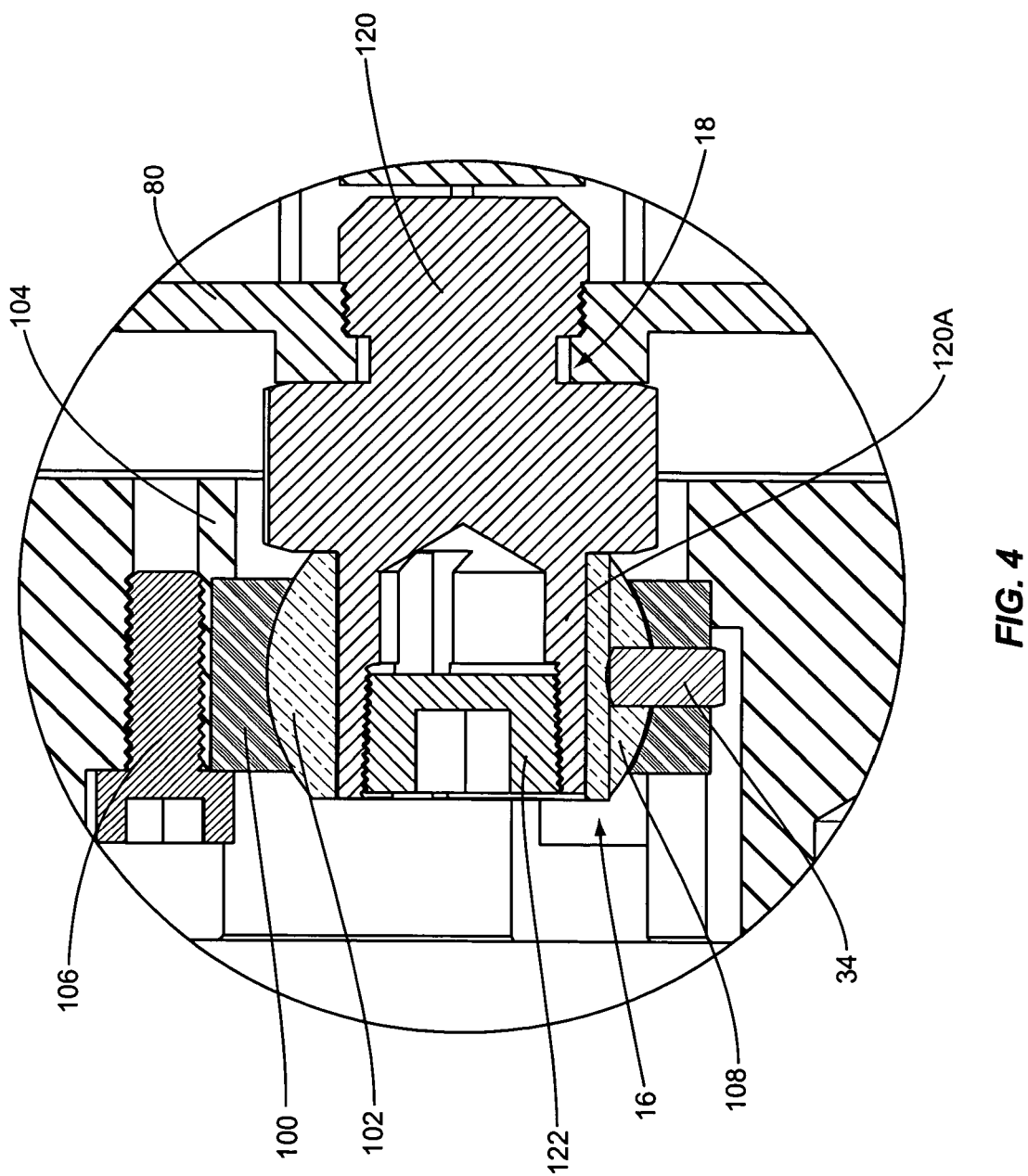
FIG. 4 is an enlarged sectional view of a portion of the deburring tool illustrating how the rear portion of the pneumatic motor is moveably mounted within the housing.

Mounted within end plate 34 is the bearing assembly indicated generally by the numeral 16 and sometimes referred to as a pivot bearing. The bearing assembly includes an outer race or socket 100. Secured within the outer race 100 is a bearing 102. In the case of the embodiment illustrated herein and particularly shown in FIGS. 2–4, the bearing 102 includes an arcuate shaped outer surface that freely moves within the race 100. Bearing 102, in the embodiment illustrated, assumes a ball or spherical configuration and includes a through bore or opening that extends through the same. Note in FIG. 4 where the end plate 34 includes a circumferential shoulder 104 that extends around a portion of the opening 36 formed therein. Formed in the end plate adjacent the shoulder 104 is a series of threaded openings that are adapted to receive a series of screws 106. Note that each screw 106 includes a head portion. To secure the bearing assembly 16 within the end plate 34, the respective screws 106 effectively pinch the outer race or socket 100 of the bearing assembly 16 between the head of the screws 106 and the circumferential shoulder 104. This is best illustrated in FIG. 4.

Bearing 102 is designed to freely move radially in all directions but prevented from free rotation. To achieve this, a slot 108 is formed in an outer portion of the bearing 102. Again, this is illustrated in FIG. 4. A dowel pin 110 is inserted through the outer race 100 into the slot 108. The dowel pin is fixed with respect to the outer race 100. Thus the bearing 102 can pivot within the outer race 100 about the axis of the dowel pin 100. Further, the bearing 102 can rock back and forth or from left to right as viewed in FIG. 4. That is, the bearing 102 may move such that the slot 108 formed therein moves back and forth about the dowel pin 110. Consequently, this gives rise to the bearing having the capability to move or pivot. However, the dowel pin 110 and the slot 108 prevent the bearing 102 from rotating about the longitudinal axis of the race 100 of the bearing.

Extending from the pneumatic motor 14 into the bearing assembly 16 is a connector indicated generally by the numeral 18. The connection 18 may be a part of the pneumatic motor 14 or may be a separate component. As noted above, formed in the back 84 of the pneumatic motor 14 is a threaded bore. Secured within the threaded bore is a stud 120. See FIGS. 2–4. Stud 120 projects rearwardly from the back 84 of the motor 14. Forming a part of the stud 120 is a series of expandable threaded sections 120A. See FIGS. 2 and 4. The expandable sections 120A project through the opening within bearing 102. To secure the connector 18 and particularly stud 20 within the opening within bearing 102, there is provided a tapered threaded plug 122. Threaded plug 122 is screwed into the opening formed within the expandable sections 120A. As the threaded plug 122 is advanced, the sections 120A of the stud expand and engage the bearing 102. As the plug 122 is advanced towards the pneumatic motor 14, the expandable sections 120A continue to be expanded and a resulting outward directed force causes the expandable sections 120A to be securely stationed within the internal opening within the bearing 102.

Figure 5:
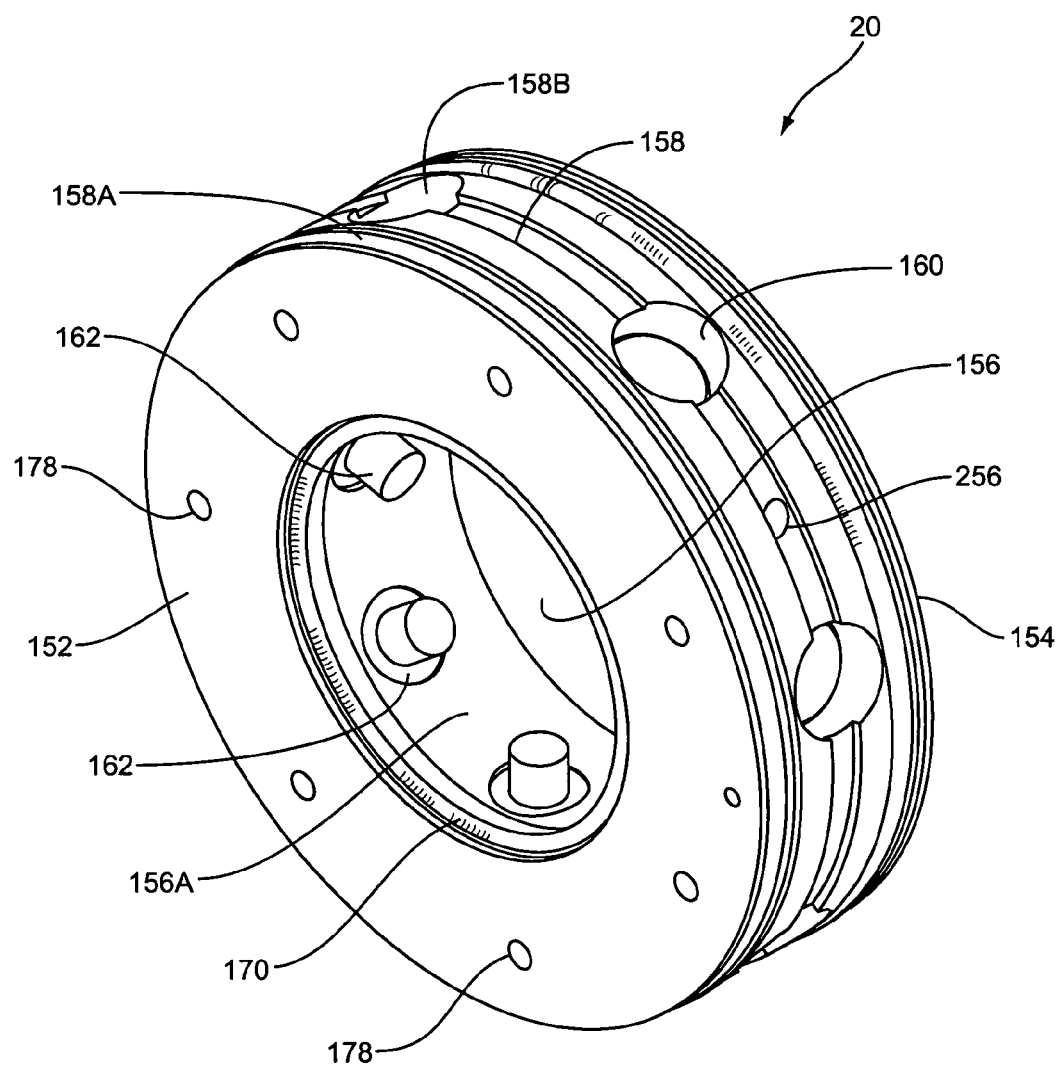
FIG. 5 is a perspective view of the compliance device of the deburring tool.

Mounted in the front portion of the housing 12 is the compliance device 20. Compliance device 20 is particularly illustrated in FIGS. 5–7. Compliance device 20 assumes a ring configuration and is adapted to extend around the spindle housing 82 of the pneumatic motor 14 when mounted within the housing 12. With particular reference to FIG. 5, the compliance device 20 is shown therein and includes two sides 152 and 154. When mounted within the housing 12, side 152 forms a front side while side 154 forms a rear side and faces back towards the rear portion 80 of the pneumatic motor 14. Formed within the compliance device 20 is an opening 156. Opening 156 is defined by a circumferential surface 156A. Extending around the outer edge of the compliance device 20 is a circumferential edge 158. Formed about circumferential edge 158 is a pair of spaced apart O-ring seats 158A and 158B. When mounted within the housing 12, a pair of O-ring seals 168 are seated within seats 158A and 158B.

Formed in the compliance device 20 is a series of spaced apart piston assemblies. Each piston assembly is formed by a bore 160. Note that each bore 160 extends from the circumferential edge 158 inwardly to the central opening 156. A bushing 162 is pressed into each bore 160. This is illustrated in FIGS. 7 and 9. Reciprocally mounted in the bushing 162 is a piston indicated by the numeral 164. Piston 164 includes a base 164A and a seal seat 164B that extends around base 164A. As will be explained later, the compliance device 20 is adapted to operate in two different modes, one mode with seals and one mode without seals. FIG. 7 illustrates the mode where the respective pistons 164 are provided with seals. More particularly, there is provided a seal 164C that is seated within seal seat 164B. Extending inwardly through the bore 160 is a rod or pin 164D. Rod or pin 164D includes a generally arcuate or rounded outer tip.

As is appreciated, compliance device 20 is operated by fluid. In the case of one embodiment, compressed air is utilized to actuate and bias the pistons towards an extended position (shown in FIGS. 7 and 9) within opening 156. Consequently, it is important to provide compressed air between the circumferential edge 158 and the central section 30 of the housing 12. Therefore, an air channel 256 is provided within the outer ring of the compliance device 20. More particularly, the air channel 256 includes an inlet end formed on the rear side 154. The air channel extends therefrom a predetermined distance and then turns approximately 90° where the same air channel terminates about the circumferential edge 158. See FIG. 5. Thus, air can be directed into an opening or port formed on the rear side 154 of the compliance device and through the air channel 256 to where the air is exhausted out the circumferential edge 158. From there the air can move around the circumferential edge 158 and into the various bores 160 formed in the ring portion of the compliance device 20.

To retain the air about the circumferential edge 158 of the compliance device 20, there is provided a pair of O-rings 168. This is particularly illustrated in FIGS. 7 and 9 as well as FIG. 3.

Formed about the front portion of the central opening 156 is a relatively soft O-ring buffer 170. As will be appreciated from subsequent portions of the disclosure, a sleeve extends around the spindle housing 82 of the pneumatic motor 14 and as the front or spindle housing 82 moves back and forth, the buffer 170 functions to engage and soften the impact of the spindle housing 82.

To facilitate mounting and aligning the compliance device 20 in the front portion of the housing 12, there is provided at least one bore 172 that is formed on the rear face 154 of the compliance device. One or more pins 174 project from the shoulder 44 into the one or more pin bores 172. A snap ring 176 is snapped into a groove in the front opening 42 of the central section 30. Snap ring 176 abuts against the front face 152 of the compliance device 20 and holds the same within the front portion of the housing. Note that the shoulder 44 formed in the front portion of the housing 12 acts as a stop against which the backside 154 abuts when the compliance device 20 is mounted within the housing. Therefore, the compliance device is securely held in place within the housing 12 by the shoulder 44 and the snap ring 176.

Secured on the spindle housing 82 of pneumatic motor 14 is a contact sleeve 200. Contact sleeve 200 is particularly spaced on the spindle housing 82 such that it aligns with the pistons 164 disposed within the compliance device 20. This is particularly illustrated in FIG. 3. Formed on the inside surface of the contact sleeve about a front portion is an O-ring seat. An O-ring 202 is secured within the seat and acts as an interface between the contact sleeve 200 and the adjacent spindle housing 82. In addition, the contact sleeve 200 is firmly fixed about the spindle housing 82 by a retaining ring 204. As illustrated in FIG. 2, retaining ring 204 is designed to fit over the spindle housing 82 and to securely lock the contact sleeve 200 in a position on the spindle housing 82 where the compliance device surrounds the contact sleeve. Therefore, it is appreciated that when a compliance force is exerted on the pneumatic motor 14 by the compliance device 20, that the pistons 164 of the compliance device will actually engage the outer surface of the contact sleeve 200.

The front portion of the deburring tool 10 is closed by a boot 206 and a boot retaining ring 208. More particularly, boot 206 is slipped or past over the spindle housing 82 of the pneumatic motor 14 and secured around the front face or side 152 of the compliance device 20 by the boot retaining ring 208. A set of screws 210, as illustrated in FIGS. 2 and 3, are extended through openings within the boot retaining ring 208 and further through the openings within the boot 206 and screwed into the threaded bores 178 formed on the face 152 of the compliance device 20.

In a preferred embodiment, the power source for driving the deburring tool 10 is a pneumatic type motor. To supply air to the pneumatic motor 14 there is provided an air inlet fitting 230. See FIGS. 1–3. Air inlet 230 is of an L-shaped design and is directed to the pneumatic motor 14 through an opening in the central section 30 of the housing 12. Note that a portion of the air inlet 230 is directed through a boot 232 and a retaining ring to where the air inlet connects to an opening in the pneumatic motor 14. Boot 232 is held within the opening within central section 30 by the retaining ring 234. In operation, a source of compressed air is connected to the air inlet 230 and supplies air to the pneumatic motor 14.

Figure 10:
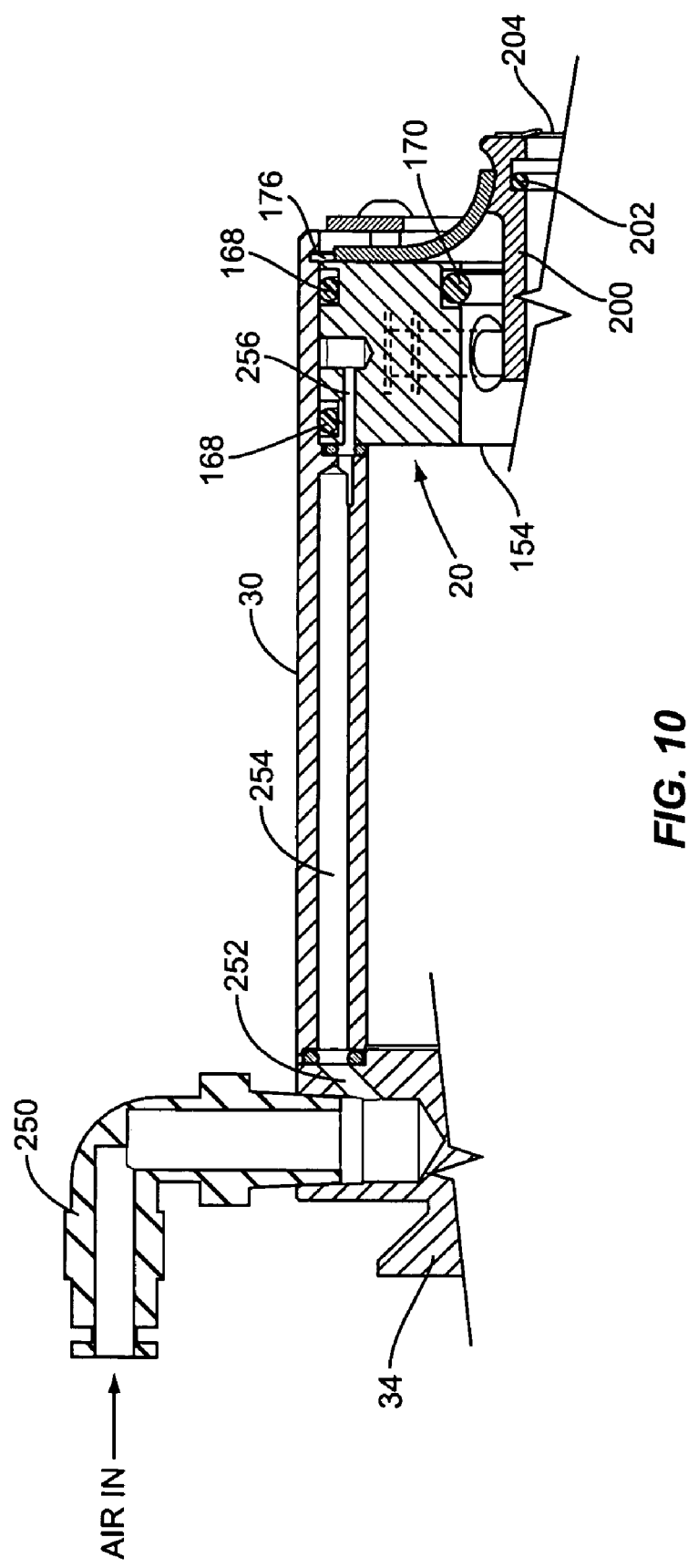
FIG. 10 is a fragmentary sectional view of the deburring tool illustrating the manner of directing compressed air to the compliance device.
Figure 11:
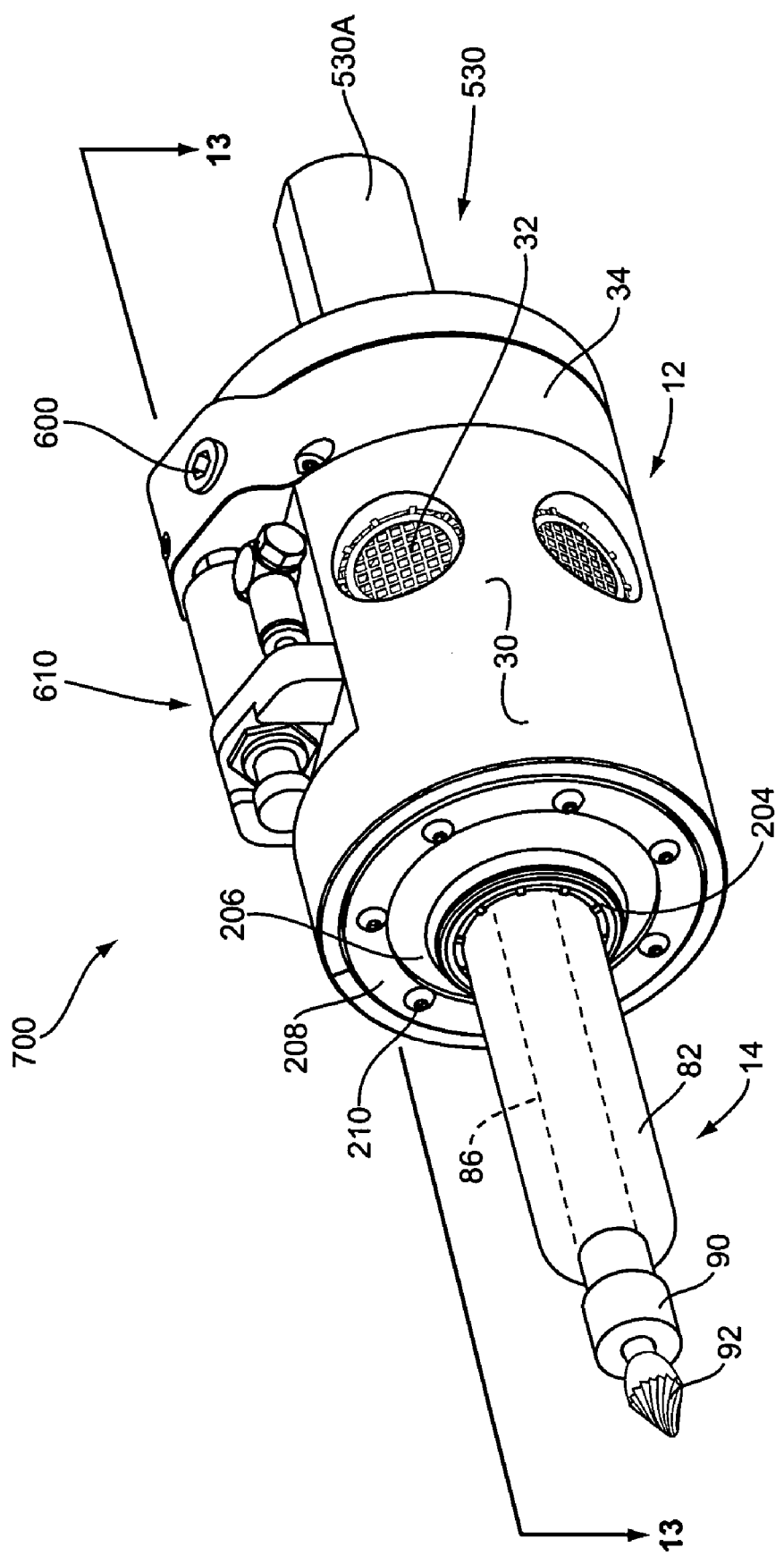
FIG. 11 is a perspective view of a second design for the deburring tool.
Figure 12:
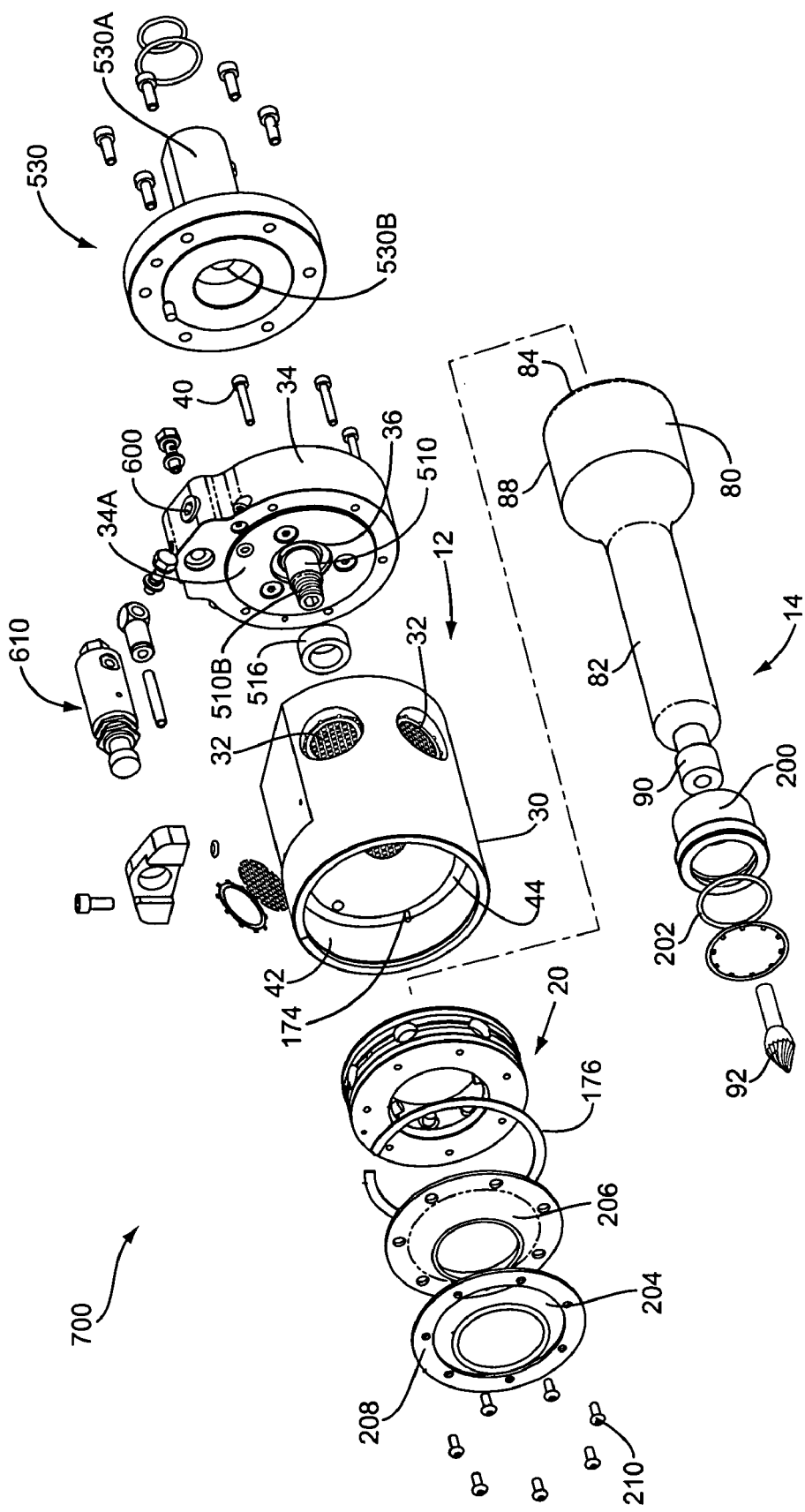
FIG. 12 is a perspective exploded view of the deburring tool of FIG. 11.

Another air inlet, air inlet 250 is also provided. Air inlet 250 is secured to port 38 formed in the end plate 34. Air inlet 250 is utilized to direct air into the deburring tool 10 that is ultimately used to drive or power the compliance device 20. In order to route compressed air from the air inlet 250 to the compliance device 20, there is provided a series of air channels or conduits formed in the housing 12. See FIG. 10. In this regard, there is an air channel 252 that extends from port 38 in the end plate 34. In addition, another air channel 254 extends through the wall of central section 30 and connects air channel 252 with air channel 256 formed in the compliance device 20. As seen in FIG. 10, the air channel 256 formed in the compliance device 20 extends inwardly from the rear side 154 a predetermined distance and then turns outwardly and extends towards the outer circumferential edge 158 of the compliance device where the air channel terminates.

It is appreciated that when the end plate 34 is secured to the central section 30 of the housing and the compliance device 20 is properly secured within the housing 12, that the air channels 252, 254 and 256 will align. In addition, there will be provided O-rings between the respective air channels so as to prevent air from significantly leaking as the air moves from the end plate 34 to the compliance device 20.

Compliance device 20 functions to center the spindle housing 82 of the pneumatic motor during operation. However, the compliance device is yieldable. That is, when a disturbing force is encountered by the deburring tool 92, the spindle housing 82 will be caused to move and one or more pistons mounted within the compliance device 20 will be engaged by the spindle housing 82 and because of the disturbing force, the respective pistons 164 will yield and retract within the bores 160 of the compliance device 20. As the robotic tool moves around the surface being deburred, the disturbing force will subside, and the pneumatic pressure acting on the pistons 164 will urge the spindle housing 82 to a centered position. Because of the constant pneumatic pressure being applied to the base 164A of the pistons, the tendency of the compliance device is, of course, to maintain the spindle 62 in a centered position as illustrated in FIG. 3.

As illustrated in FIGS. 6–9, the respective pistons 164 have a limited inward extension. In FIGS. 7 and 9 the pistons 164 are fully extended inwardly. Note that the base 164 abuts against the bushing 162. This assures that the pistons 164 can only be extended inwardly a predetermined distance.

One feature of the deburring tool 10 of the present invention is that the deburring tool can provide a variable compliance force. This is particularly illustrated in FIGS. 7 and 9. That is, in one mode of operation deburring tool 10 may provide a greater compliance force than in a second mode of operation. This is achieved by electing on the one hand to utilize the seals 164C or electing not to use the seals. In FIG. 7, for example, the deburring tool 10 has been set up in a mode of operation that utilizes seals 164C around the base 164A of each piston 164. As illustrated in FIG. 7, the effective area subjected to the compressed air is illustrated by the letter X. To reduce the compliance force being exerted by the compressed air on the pistons, the seals 164C can be removed. This is illustrated in FIG. 9. Here note that there are no seals extending around the seal seat 164B. In this case, as illustrated in FIG. 9, the effective area acted on by the compressed air is illustrated by the letter Y.

In the case of the design illustrated herein, the pneumatic motor 14 includes a varying cross sectional area from back to front. As seen in the drawings, the back or rear portion 80 of the pneumatic motor 14 is larger than the front portion of the motor. This means that the back portion 80 would weigh more than the front portion of the motor and consequently the center of gravity of the motor 14 would tend to be located more towards the rear or back portion of the motor than towards the front portion of the motor. Accordingly, the present invention has placed the primary mounting structure for the pneumatic motor 14 adjacent the rear portion 80. In this regard, as discussed above, the bearing assembly 16 is disposed adjacent the back wall 84 of the motor. The arrangement of the bearing assembly 16 and the connector 18 permits the motor 14 to swivel or pivot about the outer race 100 of the bearing 16. In the case of the particular embodiment illustrated herein, the motor 16 can move or pivot radially similar to a joystick. Other types of mounting arrangement could be utilized.

The deburring tool 10 of the present invention has many advantages. Because of the design and arrangement of the motor 14, compliance device 20 and the manner of movably mounting the motor 14 within the housing 12, the overall deburring tool is relatively small, of a light weight, and inexpensive.

In the embodiment illustrated in FIGS. 1–10, air for driving the pneumatic motor 14 is directed into the side of the deburring tool 10. In some cases, it may be desirable to feed or direct air axially into the motor 14. Accordingly, in the embodiment illustrated in FIGS. 11–15, the design of the deburring tool 700 provides for an axial air feed.

Figure 13:
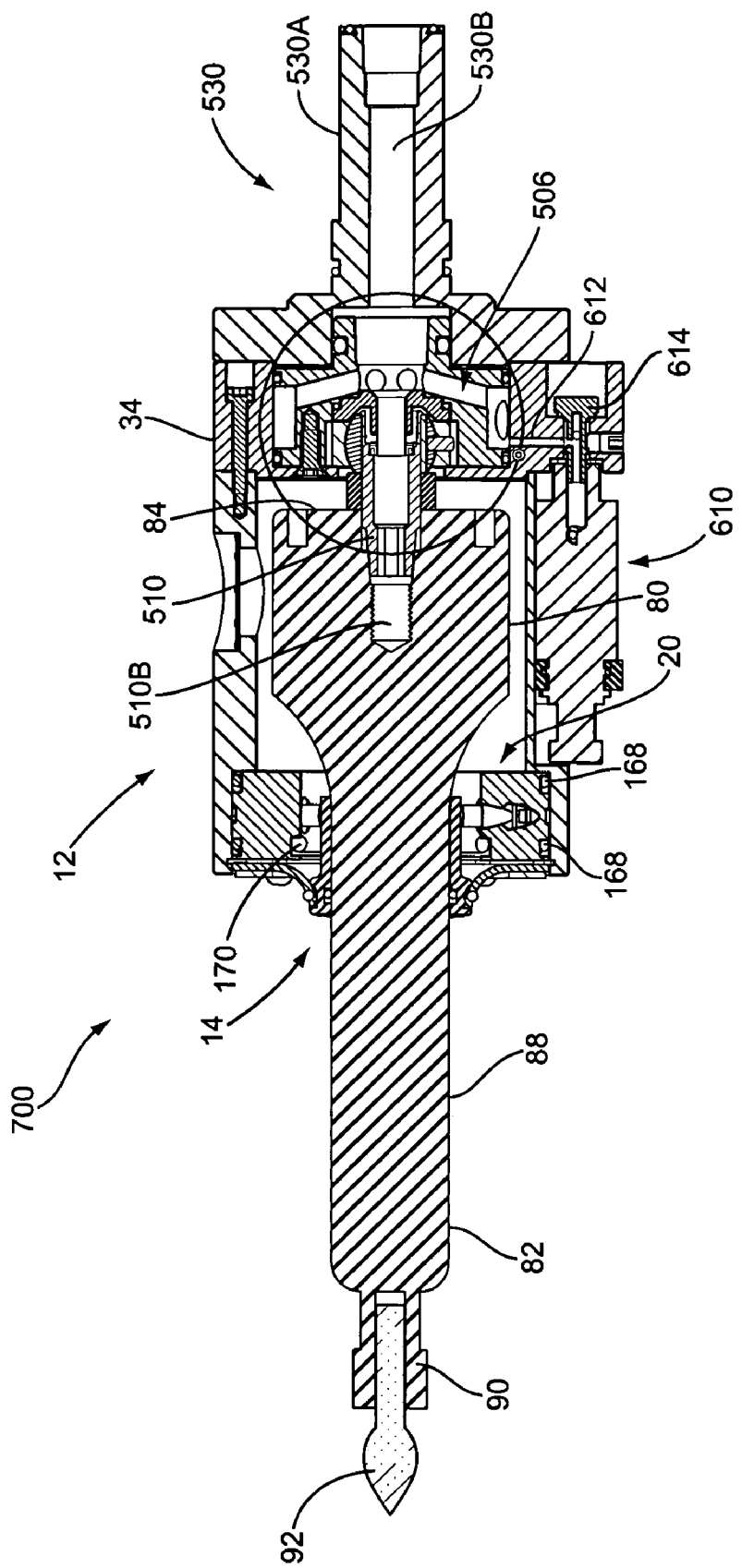
FIG. 13 is a cross-sectional view taken through the line 13—13 of FIG. 11.
Figure 14:
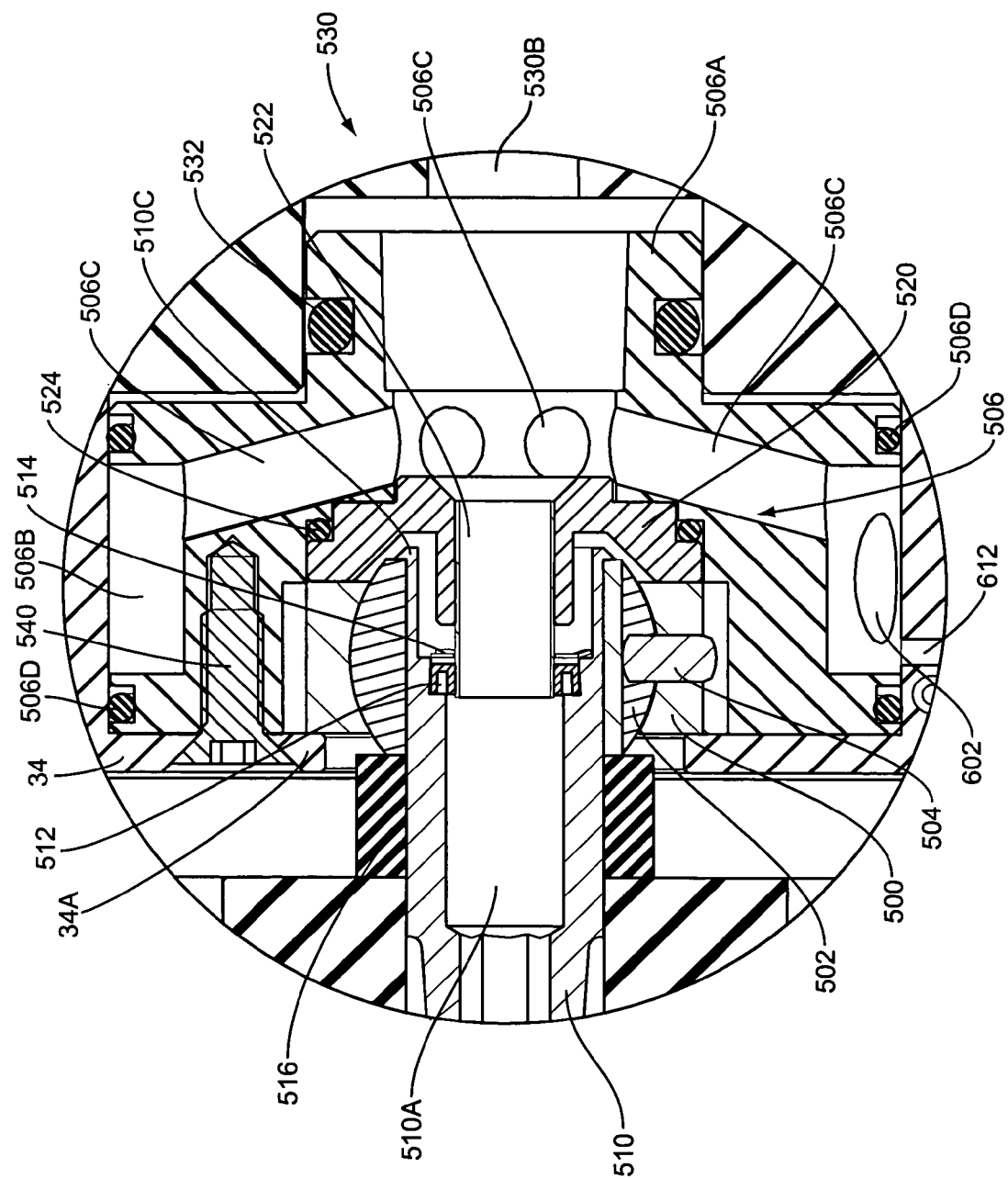
FIG. 14 is an enlarged view of the encircled area shown in FIG. 13.
Figure 15:
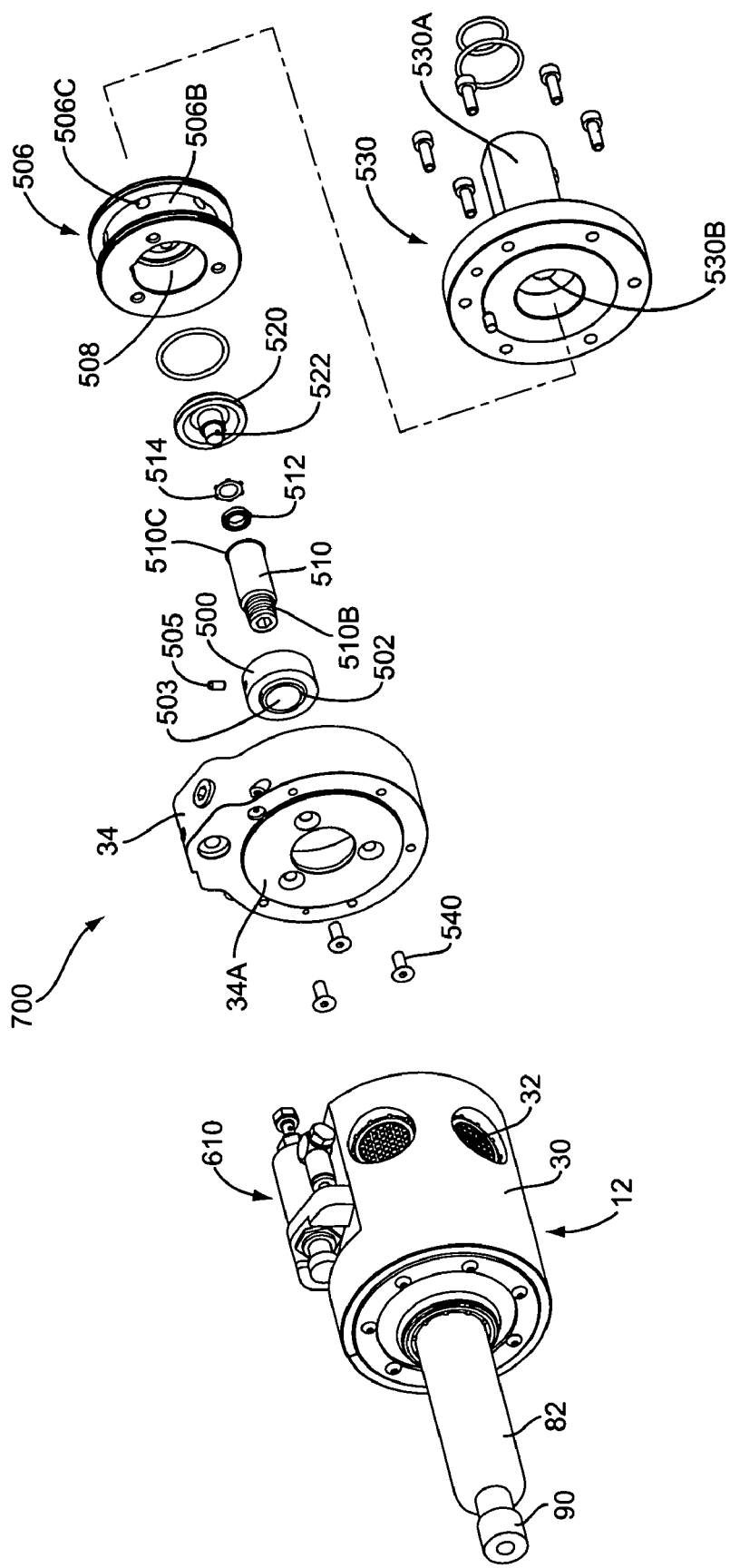
FIG. 15 is a perspective exploded view of portions of the deburring tool shown in FIGS. 11–14.

With reference to FIGS. 13–15, there is shown a pivot bearing mounted within the housing 12 and adjacent the back wall 84 of motor 14. Forming a part of the pivot bearing is a race 500. Secured within the race 500 is a bearing 502. Bearing 502 is a spherical bearing with a through opening 503 formed therein. See FIG. 15. A dowel pin 504 extends from the race 500 and projects into a groove or slot formed in the bearing 502. As viewed in FIG. 14, bearing 502 can rotate about the dowel pin 504. In addition, bearing 502 can rock back and forth in a left to right and right to left direction as viewed in FIG. 14. Bearing 502 is precluded from rotating within the race 500 about a longitudinal axis. Race 500 includes a pin 505 that extends upwardly therefrom that, as will be appreciated from subsequent portions of the disclosure, fits in a key way in an adjacent housing. See FIG. 15. This precludes the race 500 from rotating in the adjacent housing.

A housing structure is provided for receiving and holding the pivot bearing. This housing structure is referred to as a housing or air cap and indicated by the numeral 506. As viewed in FIG. 13, the housing 506 is held and supported by the rear housing or plate 34. In particular, rear housing 34 includes an internal area that accepts and holds the housing or air cap structure 506 that in turn holds and supports the pivot bearing. As will be appreciated from subsequent portions of the disclosure, housing 506 includes an axial bore or opening 508 that permits air to flow therethrough. See FIG. 15. Further, the housing or air cap 506 includes a series of radial air passageways 506C that permit air to flow through the same. Details of the housing or air cap 506 will be discussed subsequently herein.

Secured or retained within the pivot bearing is a motor support 510. Motor support 510 projects from the pivot bearing forwardly and connects to the back wall 84 of the pneumatic motor 14. Secured around motor support 510 just forwardly of the pivot bearing is a collar 516. The purpose of the collor 516 is to provide sufficient spacing between the motor 14 and the housing to allow pivoting motion. In this embodiment, the motor support 510 actually channels compressed air to pneumatic motor 14 for the purpose of driving the motor. In that regard, motor support 510 includes a hollow interior area 510A that leads from the pivot bearing to the pneumatic motor 14. The end portion of the motor support 510 is threaded and is referred to by 510B. Threaded end portion 510B is adapted to screw into a threaded bore (air inlet) formed in the backside of the motor 14. As noted before, motor support 510 projects from the pivot bearing. In particular, motor support 510 projects through opening 503 formed in the spherical bearing 502. Thus, the outside diameter of the motor support 510 is slightly less than the diameter of opening 503 in bearing 502. In order to retain the motor support 510 within the bearing 502, formed about the end of the motor support opposite the threaded end, is a lip 510C. Lip 510C prevents the motor support from being pushed or pulled forwardly through the opening 503 of the bearing 502.

Secured internally within the hollow interior area 510A of motor support 510 is a seal 512. Seal 512 is retained internally within the motor support 510 by a retaining ring 514. As will be discussed below, air for driving motor 14 is transferred through the pivot bearing and through the hollow interior 510A of motor support 510. Seal 512 is provided to cooperate with additional structure to be described later to seal the flow of air passing through the pivot bearing and through the motor support 510 as the motor support articulates within the pivot bearing.

Deburring tool 700 is provided with an air inlet for directing air to the pivot bearing and to the motor support 510. Various structures can be provided to perform this function. With reference to the drawings, what is sometimes referred to as a nipple assembly is utilized to direct air through at least a portion of the pivot bearing and into the hollow interior area 510A of the motor support 510. In this case, the nipple assembly is seated within bore 508 of housing 506. As seen in FIGS. 14 and 15, the nipple assembly includes a retainer 520. Note in FIG. 14 how retainer 520 seats within the bore 508 of the housing 506. An O-ring 524 is interposed between retainer 520 and a portion of the bore 508 of the housing 506. Retainer 520 includes an opening. Projecting from the opening is a pipe or conduit 522. When retainer 520 is properly seated within the housing 506, the terminal end portion of the pipe or conduit 522 will project into the open end of the motor support 510. Further, the terminal end portion of the pipe 522 will project into and through the hollow portion 510A of the motor support 510 and through the seal 512. This is illustrated in FIG. 14. Thus there is provided a sealed relationship between the pipe 522 and the interior area 510A of the motor support 510.

Retainer 520 and the pipe or conduit 522 projecting therefrom remain stationary. However the motor support 510 articulates or moves with the motor 14. This means that the seal 512 contained within the motor support 510 also moves. Essentially, seal 512 deforms about the outer end of the pipe or conduit 522 as the motor support 510 articulates with the pivot bearing. While seal 510 may slightly deform as the motor support 510 articulates, the seal 512 maintains a generally airtight sealed relationship at the interface between the motor support 510 and the pipe or conduit 522. Thus, it is appreciated that air can freely move through the conduit 522, through the pivot bearing, and into and through the motor support 510 even while the motor support is articulating within the pivot bearing.

In the case of the embodiment illustrated herein, air is directed to the housing 506 and to the pipe or conduit 522 by a Weldon shank indicated generally by the numeral 530. As seen in FIG. 13, Weldon shank 530 fits adjacent the back side of the rear housing 34 and adjacent the back of the housing 506. Further an outer flange 506A of housing 506 projects into the Weldon shank 530 when the Weldon shank is secured by screws or other fastening means to the back of the rear housing 34. Note the provision of an O-ring 532 that is provided at an interface between the flange 506A of housing 506 and the Weldon shank 530. See FIG. 14. As seen in the drawings, the Weldon shank 530 includes an elongated shank 530A that forms an interior air conduit 530B.

As discussed before, the deburring tool of this embodiment is particularly suited for use with machine systems such as a CNC machine. In such a case, the Weldon shank 530 is adapted to receive an adapter that would, in turn, enable the entire deburring tool 10 to be mounted to a CNC machine, for example. Because such machines include their own internal source of compressed air, air is be directed from the machine system directly to the Weldon shank 530 and through the interior conduit 530B.

Returning to the housing or air cap 506 that holds and retains the pivot bearing, it is seen that the same includes the rear annular boss 506A. This annular boss 506A was briefly discussed above as it projects into the Weldon flange 530. Formed about the outer portions of the housing 506 is a circumferential cavity 506B. Extending between the circumferential cavity 506B and the central bore 508 of the housing is the series of radial air passageways 506C. Thus, it is appreciated that air can be freely directed between the bore 508 and the circumferential cavity 506B. Further, to retain air and to provide a sealed relationship around the circumferential cavity 506B, there is provided a pair of O-rings 506D that form a seal between the circumferential cavity 506B and the adjacent rear housing 34. See FIG. 14.

As seen in FIGS. 14 and 15, the housing or air cap 506 is held within the rear housing 34. That is, housing 506 is generally bounded by the rear housing 34. Note in FIGS. 14 and 15 where the rear housing 34 includes an annular front face referred to by 34A. This annular front face 34A projects inwardly over a front portion of the housing 506. Screw openings provided in the annular face 34A enable a series of screws 540 to be secured through the annular face 34A and into the body of the housing 506. This effectively secures housing or air cap 506 to the rear housing 34. The deburring tool of FIGS. 11–15 also provides the option of directing air into the side of the tool. To accommodate a side air feed there is provided a side air inlet 600 formed in the rear housing 34. See FIG. 11. Air inlet 600 opens at outlet 602 into the circumferential cavity 506B disposed between the rear housing 34 and the air cap 506. See FIG. 14. Air passing into the inlet 600 is directed out the outlet 602 and into the circumferential cavity 506B where the air can then move inwardly through the radial passageways 506C. Eventually the air is directed to the central bore 508 of the housing or air cap 506 where the air can then be directed forwardly through the pivot bearing and the motor support 510 to the pneumatic motor 14. It, of course, follows that when utilizing one air feed as opposed to the other, that the unused air feed should be plugged. Therefore, when the axial air feed discussed above is being utilized, the side inlet 600 is plugged. When the side air feed option is being utilized, the axial air path is likewise plugged. In this case a plug can be screwed into a threaded portion of the Weldon shank 530.

Air fed to the housing 506 is also utilized to drive the compliance device 20. In the embodiment shown in FIGS. 1–10 and discussed above, air is directed from the rear housing 34 through a conduit 254 formed in the outer wall of the central channel 30. Air leaving the conduit 254 is directed to the compliance device 20. There are various ways in which to channel air from the rear portion of the deburring tool to the front portion where the compliance device 20 is disposed.

In the embodiment illustrated in FIGS. 11–15, there is provided a compliance pressure regulator indicated generally by the numeral 610. See FIGS. 11–13. Pressure regulator 610 is mounted on a flat surface formed on the central housing 30. Essentially air is directed from the circumferential cavity 506B, and into the pressure regulator 610.

Pressure regulator 610 functions to direct the compressed air from the pressure regulator 610 to the forwardly disposed compliance device 20, previously discussed. In the process, the pressure of the compressed air leaving the pressure regulator 610 is controlled. Details of the flow of compressed air from the rear housing 34 to the compliance device 20 is not dealt with herein in detail because such is not per se material to the present invention.

As noted above, there are various ways to direct and control the pressure of the compressed air delivered to the compliance device 20. Briefly, as seen in FIG. 13, a bore 612 extends outwardly through a portion of the rear housing 34. Bore 612 is communicatively open to a banjo bolt 614 that connects rear housing 34 to the compliance pressure regulator 610. See FIG. 13. In conventional fashion, banjo bolt 614 includes a hollow conduit. In particular, the hollow conduit in the banjo bolt 614 is open to the bore 612. Further, the hollow conduit of the banjo bolt 614 is operative to direct air into the pressure regulator 610. Consequently, compressed air existing in the circumferential cavity 506B can be channeled outwardly through the bore 612 and through the hollow conduit of the banjo bolt 614. Compressed air from the pressure regulator 610 can be directed to the compliance device 20 in various ways. The basic operation of the compliance device 20 in the embodiment of FIGS. 11–15 is the same as that discussed with respect to the embodiment of FIGS. 1–10.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A pneumatic driven deburring device, comprising:
   a housing;
   a pneumatic motor mounted in the housing and operative to drive a deburring tool;
   a pivot bearing mounted adjacent the motor;
   a motor support secured within the pivot bearing and moveable with the pivot bearing, the motor support extending from the pivot bearing and connected to the motor;
   an air inlet disposed adjacent the pivot bearing; and
   wherein the air inlet, pivot bearing and motor support are arranged such that air for driving the deburring device is directed into the air inlet and therefrom through the pivot bearing and the motor support for driving the motor.

2. The deburring device of claim 1 wherein the motor support extends at least partially through the pivot bearing and include a shaft that includes one end portion connected to the motor.

3. The deburring device of claim 2 wherein the pivot bearing includes a spherical bearing having an opening formed therein, wherein the motor support is hollow and projects at least partially through the spherical bearing.

4. The deburring device of claim 2 wherein the motor support includes a lip for engaging the pivot bearing and at least partially retaining the motor support within the pivot bearing.

5. The deburring device of claim 1 wherein the air inlet includes a conduit that is communicatively connected to the motor support for channeling air into the motor support.

6. The deburring device of claim 5 wherein the conduit includes an end portion that projects into the motor support and wherein a portion of the motor support is confined within the pivot bearing.

7. The deburring device of claim 6 where there is provided a seal within the motor support and wherein the conduit engages the seal and wherein there is a sealed relationship established between the motor support and the conduit.

8. The deburring device of claim 7 wherein the conduit is maintained generally stationary and wherein the motor support can articulate with the pivot bearing, and wherein the seal maintains a generally sealed relationship as the motor support articulates with the pivot bearing.

9. The deburring device of claim 1 wherein the pivot bearing includes a race, a spherical bearing secured within the race, and an opening formed in the spherical bearing; and wherein the motor support is contained within the opening of the spherical bearing.

10. The deburring device of claim 1 including both an axial and side air feed.

11. The deburring device of claim 1 wherein the air inlet is generally axially aligned with the motor.

12. The deburring device of claim 11 further including a side air feed wherein at least a portion thereof is oriented generally normal to a longitudinal axis of the motor.

13. The deburring device of claim 1 having a second housing that receives the pivot bearing.

14. The deburring device of claim 13 wherein the second housing includes a central opening and one or more radial air passageways.

15. The deburring device of claim 14 wherein the second housing includes a circumferential cavity that extends at least partially around the second housing and open to one or more of the radial air passageways.

16. The deburring device of claim 13 wherein at least a portion of the air inlet extends through at least a portion of the second housing.

17. The deburring device of claim 16 wherein the air inlet includes a retainer and a conduit extending from the retainer.

18. The deburring device of claim 17 wherein the retainer is held within an opening within the second housing, and wherein the conduit extends into a portion of the motor support.

19. The deburring device of claim 18 wherein there is provided a seal that is disposed between the conduit and the motor support, and wherein the conduit is held generally stationary, but wherein the motor support can move with respect to the conduit.

20. A pneumatic driven deburring device comprising:
   a housing
   a pneumatic motor mounted to the housing and operative to drive a deburring tool;
   an air inlet;
   an articulated joint disposed between the air inlet and the motor and comprising an articulated motor support and an air passageway that extends at least partially through portions of the articulated joint;
   the motor support connected to the motor and at least partially supporting the motor such that the motor moves with the motor support as the motor support articulates; and
   wherein air for driving the motor is directed into the air inlet, through the air passageway associated with the articulated joint, and to the motor.

21. The deburring device of claim 20 wherein the air passageway extends through a portion of the motor support.

22. The deburring device of claim 21 wherein the articulated joint includes a pivot bearing and wherein the motor support extends from the pivot bearing.

23. The deburring device of claim 22 wherein the pivot bearing includes a race and a spherical bearing having an opening therein, and wherein the motor support extends through a portion of the opening within the spherical bearing.

24. The deburring device of claim 23 wherein the motor support includes a hollow conduit for directing air through the pivot bearing and through the motor support to the motor.

25. The deburring device of claim 24 wherein the air inlet includes a conduit that projects into the motor support and wherein there is provided a seal that forms an interface between the motor support and the conduit.

26. The deburring device of claim 25 wherein the conduit is fixed and wherein the spherical bearing and motor support articulate, but wherein the seal maintains a generally airtight seal between the conduit and the motor support.

27. The deburring device of claim 20 wherein the housing includes a wall structure and a back, wherein the air inlet includes an opening in the back of the housing for permitting air utilized to drive the motor to pass therethrough.

28. A method of supporting and directing air to a pneumatic motor of a deburring tool comprising:
    disposing the pneumatic motor within a housing;
    supporting a motor support in a pivot bearing;
    securing the motor support to the pneumatic motor such that the motor support can articulate in the pivot bearing and the pneumatic motor can move with the motor support;
    directing air to drive the pneumatic motor through at least a portion of the pivot bearing and through a portion of the motor support extending from the pivot bearing to the pneumatic motor; and
    directing the air from the motor support to the motor.

29. The method of claim 28 wherein the housing includes a back and including directing air into the back of the housing and therefrom to and through the pivot bearing and the motor support.

30. The method of claim 28 wherein air is directed into and to the pneumatic motor axially.

31. The method of claim 30 including switching supply air from an axial feed to a side feed.

* * * * *